US009204522B2

(12) United States Patent
Wyatt

(10) Patent No.: US 9,204,522 B2
(45) Date of Patent: Dec. 1, 2015

(54) REMOTE COMMUNICATIONS PROTOCOL

(71) Applicant: Michael Wyatt, New York, NY (US)

(72) Inventor: Michael Wyatt, New York, NY (US)

(73) Assignee: Productions Resource Group, LLC, New Windsor, NY (US)

( * ) Notice: Subject to any disclaimer, the term of this patent is extended or adjusted under 35 U.S.C. 154(b) by 224 days.

(21) Appl. No.: 14/055,678

(22) Filed: Oct. 16, 2013

(65) Prior Publication Data

US 2014/0111117 A1 Apr. 24, 2014

Related U.S. Application Data

(60) Provisional application No. 61/714,492, filed on Oct. 16, 2012.

(51) Int. Cl.
*H05B 37/02* (2006.01)
*H04L 12/24* (2006.01)

(52) U.S. Cl.
CPC ............ *H05B 37/0254* (2013.01); *H04L 41/12* (2013.01); *H05B 37/029* (2013.01)

(58) Field of Classification Search
CPC ... H05B 37/0254; H05B 37/029; H04L 41/12
See application file for complete search history.

(56) References Cited

U.S. PATENT DOCUMENTS

| | | | | |
|---|---|---|---|---|
| 7,412,515 | B2 * | 8/2008 | Kupst et al. | 709/226 |
| 7,486,689 | B1 * | 2/2009 | Mott | 370/412 |
| 8,909,756 | B2 * | 12/2014 | Thakur et al. | 709/223 |
| 2003/0226014 | A1 * | 12/2003 | Schmidt et al. | 713/164 |

* cited by examiner

*Primary Examiner* — Jung Kim
(74) *Attorney, Agent, or Firm* — Law Office of Scott C Harris, Inc

(57) ABSTRACT

A format for controlling information between multiple masters and clients uses each of a plurality of ports over a specified line, where the specified line can be ethernet, and where the ports can be opened and closed, and where the ports are calculated based on the number assigned to the console, a console multiplier, and at least one increment that represents the kind of information where there are multiple kinds of information.

9 Claims, 2 Drawing Sheets

REMOTE COMMUNICATIONS PROTOCOL

This application claims priority from provisional application No. 61/714,492 filed Oct. 16, 2012, the entire contents of which are herewith incorporated by reference.

BACKGROUND

Different protocols exist for exchanging information between a controlling computer such as a console or the like, and devices that become part of a stage lighting show. Exemplary protocols include so-called show control, as well as DMX, and others. The kinds of devices that can be controlled include controllable lights, winches, other movement devices, video walls, and the like.

SUMMARY

An embodiment describes a flexible process and system for exchanging information between an automation control computer and show devices. According to an embodiment, the protocol is used to provide status information, print position, and movement for any device on the network.

According to an embodiment, all of the control is carried out over a single common line, and parameters are used to define ports according to the function of the signal or request.

BRIEF DESCRIPTION OF THE DRAWINGS the figures show aspects of the invention.

Specifically:

DETAILED DESCRIPTION

According to an embodiment, a communication protocol between a plurality of controlling computers 200 and 210, and a plurality of controlled devices 109 is carried out. This protocol may be carried out using UDP, User Datagram Protocol over Ethernet 105. However, other wireless and wired protocols can alternatively be used.

Figure 1:
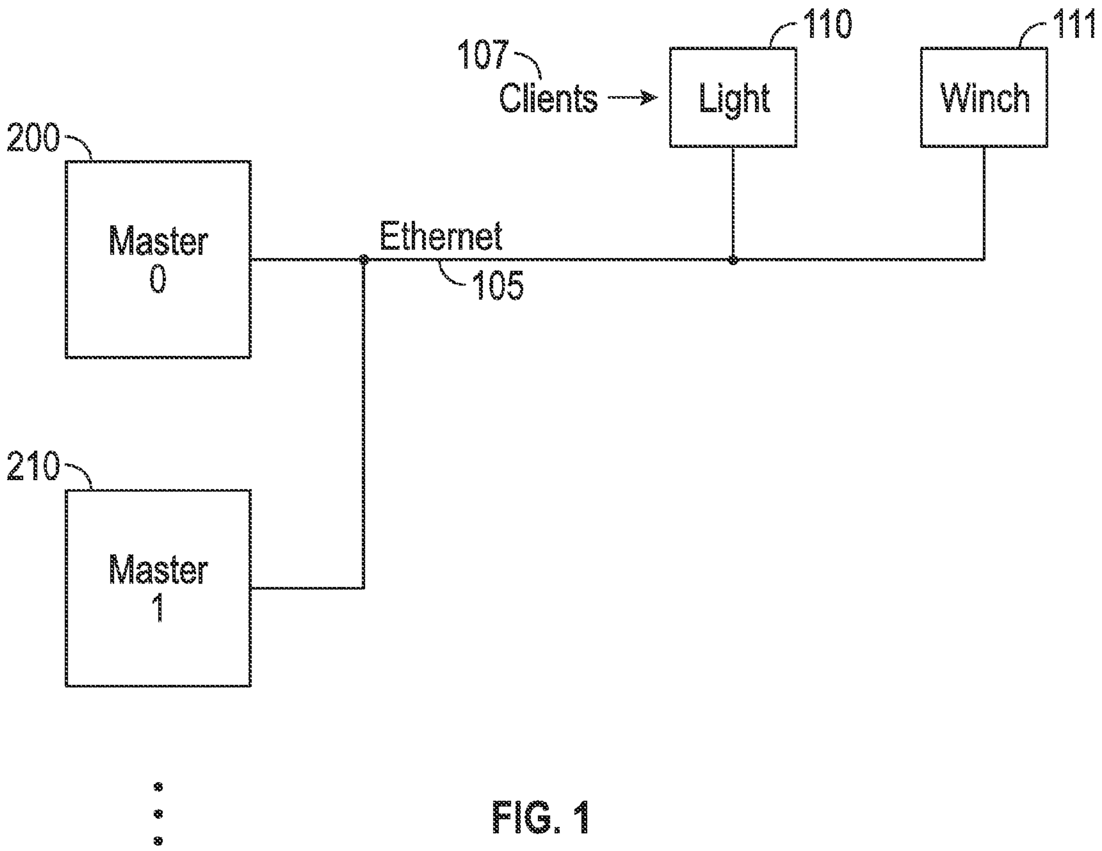
FIG. 1 shows a block diagram of the system, including multiple masters and multiple remote client.
Figure 2:
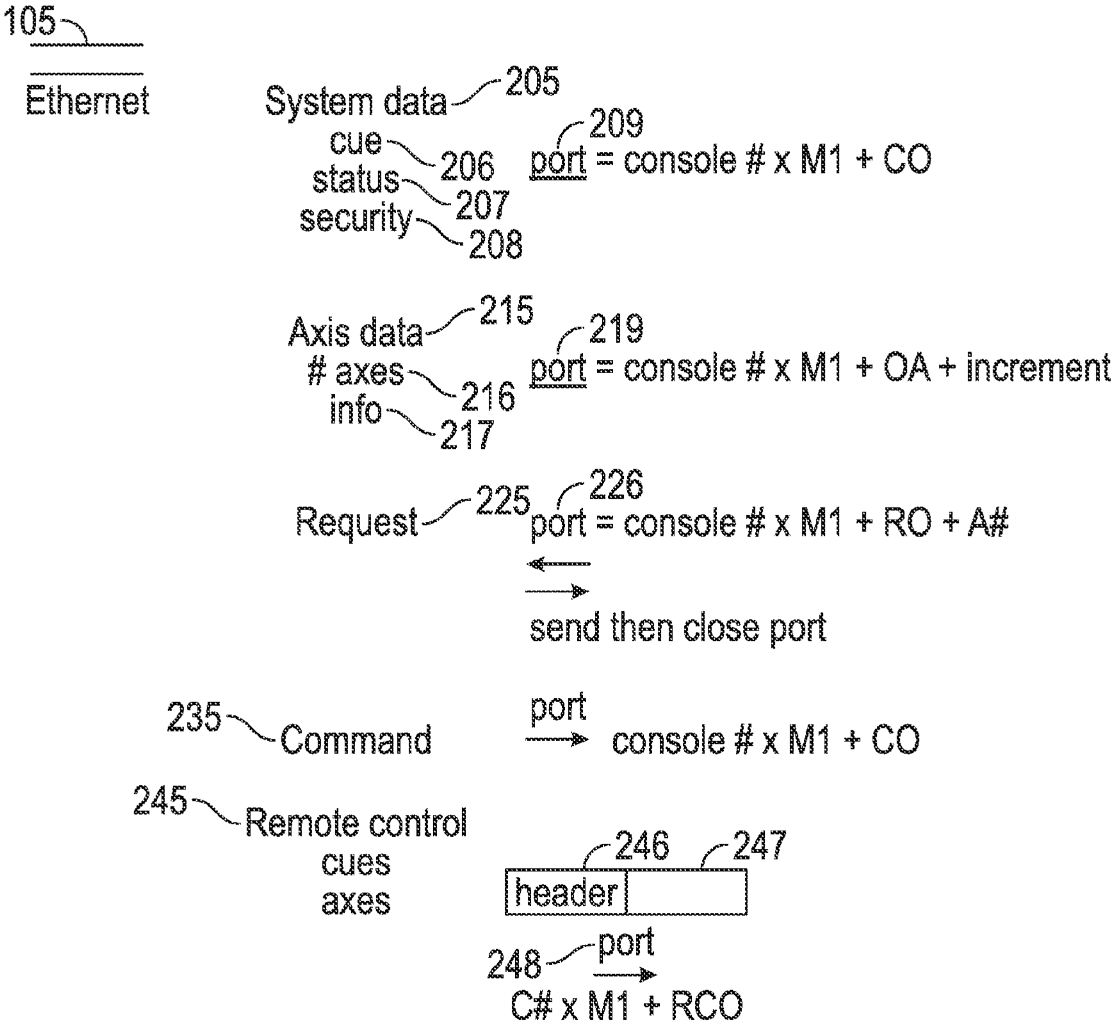
FIG. 2 shows a layout of the structure of the ethernet signal including the clients and ports that are used.

FIG. 1 shows the clients 109 including a light 110 and a winch 111, however it should be understood that the device can control many such different clients. Multiple different controlling computers can be used and all connected together. A port configuration system as described herein allows automated definition of different information being sent over different ports over the same ethernet. The packets sent and received by either the Multicast or Broadcast method of Ethernet.

A user configurable series of parameters determines the port on which this data is both sent and received. This provides a flexible, extensible and logical method of exchanging large amounts of data in a predetermined format. Due to the use of the UDP architecture, a virtually unlimited number of Masters and Remotes can be present on the same network. The protocol is formed by sending these packets over Ethernet with port numbers that are configured by a program that runs on one or all of the computers.

Master controllers functions as server computers while all Remote devices such as 109 are treated as client computers. There can be more than one Master in the network. The Master sends data on a user configurable ports using a port-definition technique as described herein. Each Master is given a unique console number.

All Masters send two types of data packets continuously, System packets and Axis packets. A third type of data, named Positions is transmitted only when requested by a Remote 109.

System data packets such as 205 contain information on the current status of the show. This information includes cue information 206 that indicates information about the current cue that is being executed about the show. For example, this can include Current cue number and description, executed cue number, Estop condition, fader values and cue conditional data.

Status information 207 can also be included which represents the condition of the different parts of the show. The status information can also indicate system fault conditions, or other information about the show such as the brightness of the lights, the condition of the winches, temperatures of the devices, and the like.

System and security information 208 can also be provided. This can include for example security information such as a password for securing remote access. This can also include information about the show that is used including the show number and the version number.

The console number and a user configurable multiplier plus an offset determines the port number for system data uses. This is shown as 209, where the port being used by a master for the system information is calculated based on the console number*multiplier M1+the console offset CO.

An example of this procedure is as follows. The first Master computer 200 is assigned console number 0. The console multiplier M1 is set as 10,000, although this number can be user-configured. The console offset CO is 1000. System Data for the first master is transmitted and received at a Multicast address with the port number of (0×10,000)+1000. In this case the port number of 1000 is used to transmit and receive System data for master 0.

Subsequent Masters such as 210 are also given unique console numbers. The second Master could have a console number of 1. For Master 210, therefore, system data packets are transmitted and received on port 11,000. (1×10,000)+1000.

Axis data packets 215 describe the show in terms of the number of axes making up the show. A first part of the information, e.g., a header, provides the number of axis in the show 216. Information about each of the axes is also provided at 217. According to an embodiment, relevant information for each of up to 10 axes can be provided. This information includes the axis number and description, submaster assignment, owner ID, type, profile count, and profile data.

Profile data can include acceleration, velocity, decay and time for each of the axes. Parameter data in the packet includes both high and low soft limit values and maximum velocity. Additionally status words in the packet provide fault and motion bits.

In one embodiment, Information for each axis is held to a fixed number of bytes. In an embodiment, there are a maximum of ten axes of data available on each Axis port. This means that for each multiple of 10 axes being controlled, an additional port is created. By limiting the number of axes to 10 per port, the total size in bytes stays less than 1000 bytes. This size is less than the most stringent switching protocols that restrict MTU, Maximum Transmission Units.

Port numbers at 219 are determined by using the console number*the console multiplier M1,+the axis offset OA+an increment of one for each additional port required after the first port. If a Master computer controlled 65 axes, then the header 216 would indicate 65 and would indicate that 65/10 or 7 packets would be needed for axes. This means that there would be packets transmitted and received on seven sequential ports with each sequential port being the next number in the increment information. The header in each packet contains the total number of axis in that packet.

The total number of ports to create by a Remote is determined by examining the total axes value sent with the system data. The first port would be at (Console number×console multiplier) plus (axis offset+0) Using the above example and an axis offset of 3000 this would be (0×10,000)+(3000+0) or port 3000. The second set of 10 axes would be at port 3,001. (0×10,000)+(3000+1). The third set of 10 would be at port 3,002. (0×10,000)+(3000+2). The last 5 axis would be at port 3,006. (0×10,000)+(3000+6).

A third type of packet called Request data can be requested from a Master. This data typically includes target positions and target descriptions. It is requested by a Remote client such as 110 using a remote control port 226. Port 226 is determined by multiplying the console number times console multiplier M1, then adding a request offset RO and the axis number A#. A Master with a console multiplier/offset of 10,000 and a request offset of 5,000 receiving a request for axis 12 position data from a Remote would send the data on port (0×10,000)+(5,000+12) or port 5012.

The request port is only active while a remote is requesting the data. Once a remote has successfully received the data it stops the request and both Master and Remote close the port.

The Receive Protocols This portion of the protocol allows two way communications between Remotes and Master controllers. These protocols are designed to minimize the amount of processing required by the Master while providing extensive control from the Remote.

A Command data port 235 is constantly monitored by each Master. The sole purpose of the command data port is to receive a request from another Master device to take primary control. This is commonly used to provide hot backup of one Master that runs in parallel with another Master. The port for this is configured using the command port offset C0. A Master configured as console 0 with a console offset of 10,000 and a command port offset C0 of 2,000 would listen for a take control request on port 2,000, (0×10,000)+2,000=2,000.

If needed, any Remote can communicate with any Master using the Remote Control protocol 245. This formatted data packet provides for individual or multiple axis control from a Remote. All or parts of cues can be selected and executed. Axis can also be controlled alone or in groups. This is done using a fixed length header 246 for cue manipulation combined with a repeating block of bytes 247 for each axis being controlled. Remotes can Arm, Disarm, Jog, Preset, Request Positions, Reset an axis and vary the velocity movement using this protocol. A Remote that commands a Master establishes a port at 248 by multiplying the console number times the console multiplier then adding the remote control offset R0. If the Master console number is 0 with a console multiplier of 10,000 and a remote control offset of 4,000 then the Remote would be expected to transmit on Port 4,000, (0×10,000)+4,000.

Configurable Parameters By configuring these parameters, the Remote Protocol is capable of providing a useful, robust and extensible framework of two way communications and change the port numbers.

Console number Value or C# is used to identify a Master controller. More than one Master can have the same console number but only one Master with the same console number can take control of the assigned axes at a time. The Master that currently has control is described as being Primary. Additional controllers with the same console number are considered Secondary and can function as hot backup. Console multiplier M1 is the value used as a multiplier in conjunction with the console number to determine the spacing of ports between Master controllers. Console offset CO is the value added to the product of the console number and console multiplier in conjunction with the console number to determine the port number used for system data.

Axis offset AO is the value added to the product of the console number and console offset that determines the starting port number for axes information. The port used for each group of ten axes after the first group of ten increments the axis offset by 1. Request offset RO is the value added to the product of the console number and console offset that determines the port number for request data.

Command offset CO is the value added to the product of the console number and console offset that determines the port number for requesting transfer of control from a Primary to a Secondary controller.

Remote Control offset RCO is the value added to the product of the console number and console multiplier that determines the port number used by a remote device to send data to a Master controller.

The System Data Packet Structure forms the port number by multiplying the console number with the console multiplier then adding the console offset. The bits can be assigned as in Table 1.

TABLE 1

| Index | Length | Type | Description |
|---|---|---|---|
| 0 | 1 | Int | Primary/Secondary |
| 1 | 3 | | Unused |
| 4 | 4 | Int32 | Show number |
| 8 | 4 | Int32 | Version number |
| 12 | 4 | Int32 | Cue number |
| 16 | 4 | Int32 | Total number of Axis |
| 20 | 4 | Single | Submaster Value 1 |
| 24 | 4 | Single | Submaster Value 2 |
| 28 | 4 | Single | Submaster Value 3 |
| 32 | 4 | Single | Submaster Value 4 |
| 36 | 4 | Single | Submaster Value 5 |
| 40 | 4 | Single | Submaster Value 6 |
| 44 | 4 | Single | Submaster Value 7 |
| 48 | 4 | Single | Master Value |
| 52 | 1 | | Submaster Force Bits |
| Bit 0 | | Submaster force 1 | |
| Bit 1 | | Submaster force 2 | |
| Bit 2 | | Submaster force 3 | |
| Bit 3 | | Submaster force 4 | |
| Bit 4 | | Submaster force 5 | |
| Bit 5 | | Submaster force 6 | |
| Bit 6 | | Submaster force 7 | |
| Bit 7 | | | |
| 53 | 1 | | Submaster Stop Bits |
| Bit 0 | | Submaster stop 1 | |
| Bit 1 | | Submaster stop 2 | |
| Bit 2 | | Submaster stop 3 | |
| Bit 3 | | Submaster stop 4 | |
| Bit 4 | | Submaster stop 5 | |
| Bit 5 | | Submaster stop 6 | |
| Bit 6 | | Submaster stop 7 | |
| Bit 7 | | | |
| 54 | 1 | | System Bits |
| Bit 0 | | Master force bit | |
| Bit 1 | | Estop bit | |
| Bit 2 | | System stopped bit | |
| Bit 3 | | | |
| Bit 4 | | | |
| Bit 5 | | | |
| Bit 6 | | | |
| Bit 7 | | | |
| 55 | 4 | | Remote password |
| 59 | 30 | String | Cue Conditional string |
| 89 | 50 | String | Cue Description string |
| 139 | 4 | Int32 | Executing cue number |

The Axis Data Packet Structure uses Axis data transmitted in blocks of 10 axis on ports. Each block of 10 axes is another port. Port number is determined by multiplying the console number with the console multiplier then adding the request offset. The data structure can be as in Table 2.

TABLE 2

| Index | Length | Type | Description |
|---|---|---|---|
| Packet Header | | | |
| 0 | 1 | Byte | Total axis in packet |
| Packet payload for 1st axis in packet (payload repeats for next axis every 92 bytes) | | | |
| 1 | 4 | Int32 | Axis number |
| 5 | 20 | String | Axis description |
| 25 | 1 | | Submaster ID |
| Bit 0 | | Submaster 1 | |
| Bit 1 | | Submaster 2 | |
| Bit 2 | | Submaster 3 | |
| Bit 3 | | Submaster 4 | |
| Bit 4 | | Submaster 5 | |
| Bit 5 | | Submaster 6 | |
| Bit 6 | | Submaster 7 | |
| Bit 7 | | | |
| 26 | Byte | Owner ID | |
| 27 | Byte | Axis type | |
| 28 | Byte | AVD count | |
| 1st AVD Profile | | | |
| 29 | 4 | Single | Current Position |
| 33 | 4 | Single | Target Position |
| 37 | 4 | Single | Accel |
| 41 | 4 | Single | Decel |
| 45 | 4 | Single | Time |
| 49 | 4 | Single | Velocity |
| Axis Conditional | | | |
| 53 | 20 | String | Axis Conditional String |
| Axis Parameters | | | |
| 73 | 4 | Single | Soft Plus limit |
| 77 | 4 | Single | Soft Minus limit |
| 81 | 4 | Single | Vmax (maximum velocity) |
| Updated fault bits | | | |
| 85 | 1 | | Fault Bits 1 |

Remote Control Packet Structure uses request data transmitted from remote Master controller. The port number is determined by multiplying the console number with the console multiplier then adding the axis offset plus 1 for each block of ten axes after the first block of ten. Packet is fixed length of 558 bytes in length. This can use the data Structure as in Table 3.

TABLE 3

| Index | Length | Type | Description |
|---|---|---|---|
| Packet Header | | | |
| 0 | 1 | Byte | Owner ID (last 3 digits of IP address) |
| 1 | 1 | | System Commands |
| Bit 0 | | | |
| Bit 1 | | Go | |
| Bit 2 | | Stop | |
| Bit 3 | | Advance | |
| Bit 4 | | Reverse | |
| Bit 5 | | Select Cue | |
| Bit 6 | | | |
| Bit 7 | | | |

TABLE 3-continued

| Index | Length | Type | Description |
|---|---|---|---|
| 2 | 4 | Int32 | Cue number request |
| 6 | 2 | Int16 | Total number of Axis |
| Packet Payload begins here and repeats every 11 bytes | | | |
| 8 | 2 | Int16 | Axis Number |
| 10 | 1 | | Axis Commands |
| Bit 0 | | Disarm/Arm | |
| Bit 1 | | Jog | |
| Bit 2 | | Preset | |
| Bit 3 | | Send Existing Positions | |
| Bit 4 | | Handheld Reset | |
| Bit 5 | | Relinquish Ownership | |
| Bit 6 | | | |
| Bit 7 | | | |
| 11 | 4 | Single | Command Value 1 |
| Jog Target | | | |
| Preset Position | | | |
| 15 | 4 | Single | Command Value 2 |
| Jog Velocity | | | |
| 16 | | | Payload for next Axis begins here. |

Request Data Packet Structure receives existing position values and names from a Master Port is determined by multiplying the console number with console multiplier then adding the command offset. This can have the Structure of Table 4

TABLE 4

| Index | Length | Type | Description |
|---|---|---|---|
| 0 | 8 | | Currently unused. |
| Packet Payload begins here and repeats every 20 bytes | | | |
| 8 | 4 | single | Target value |
| 12 | 16 | String | Target Description |
| 28 | | | Payload for next existing position begins here . . . Maximum of 50 existing positions |

Take Control Packet Structure

Sent from a Secondary Master to the Primary Master to request control as Primary. Port is determined by multiplying the console number with the console multiplier then adding the Command offset. This can have the structure shown in Table 5.

TABLE 5

| Index | Length | Type | Description |
|---|---|---|---|
| 0 | 1 | | Send value of 1 to rRequest control = 1 |

These parameters can be affected by programming that is put onto the master and run simultaneously in any and/or all of the Masters either at the same time or individually. The programs that run on the master may both assign the ports and recognize the ports, so that all of the Masters and clients have the same definition of ports.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other formats and other port numbers can be can be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The lights which are described herein can be computer-controlled, and can be controlled for example over a network or DMX connection by sending remote controls over that connection. These lights can also, for example, the remotely controllable for pan and tilt.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer system, comprising:

a computer that communicates show information indicative of a show being carried out, said show information being communicated over a common line for each of a plurality of different types of information, and each of the different kinds of information receiving a port number, where the port number is defined as a console number multiplied by a multiplier, and added to an offset, where the offset indicates the kind of information, and where there are multiple consoles.

2. The system as in claim 1, wherein the multiplier and the offset have values that are user controllable.

3. The system as in claim 1, wherein the multiplier and the offset are sufficiently large as to allow multiple items of said information to be transmitted.

4. The system as in claim 1, wherein the show information includes system data including information indicative of the show including a cue number.

5. The system as in claim 1, wherein the show information includes axis data including multiple different axes making up the show.

6. The system as in claim 5, wherein the axis data is limited to a number of axes that maintain a packet for each port being less than 1000 bytes.

7. The system as in claim 1, wherein the show information includes system data including at least a cue number, said system data being on first ports for each of a plurality of master units, axis data including multiple different axes making up the show, said axis data in groups, and each group being on second ports for each of a plurality of master units, request data, defining requests from remote clients, each of the request data being on an individual port and switchover data, that requests a master to switch over to another master, said switchover data being on a fourth port.

8. The system as in claim 1, wherein the show information includes request data received from a remote client, on a specified port, where the port is opened for the request data and closed after sending the request data.

9. A system of communicating show information between devices, comprising:

a port calculator device, which calculate support to be used to hold said show information, where said port calculator device calculates said information based on a console number assigned to the console that is communicating with said show information, where there are multiple consoles and each console has a number, said console number being multiplied by a console multiplier, and added to and offset to form the port, where said console multiplier is constant, and said offset is based on a kind of information that is being sent.

* * * * *